(12) United States Patent
Dobrawa et al.

(10) Patent No.: US 6,980,070 B1
(45) Date of Patent: Dec. 27, 2005

(54) DRIVE UNIT FOR SWITCHING CIRCUIT BREAKERS ON AND OFF

(75) Inventors: Andreas Dobrawa, Berlin (DE); Ralf-Reiner Volkmar, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,522

(22) PCT Filed: Mar. 19, 1999

(86) PCT No.: PCT/DE99/00916

§ 371 (c)(1),
(2), (4) Date: Jan. 8, 2001

(87) PCT Pub. No.: WO99/49487

PCT Pub. Date: Sep. 30, 1999

(30) Foreign Application Priority Data

Mar. 23, 1998 (DE) ................................ 198 13 810

(51) Int. Cl.[7] ............................................. H01H 9/20
(52) U.S. Cl. ...................................... 335/160; 335/201
(58) Field of Search ...................... 335/16, 147, 68–70, 335/159–162, 195

(56) References Cited

U.S. PATENT DOCUMENTS

| | | | | |
|---|---|---|---|---|
| 3,198,907 A | * | 8/1965 | Archer et al. ................ | 318/475 |
| 3,470,503 A | * | 9/1969 | Dexter ......................... | 335/69 |
| 3,629,744 A | * | 12/1971 | Maier et al. .................. | 335/89 |
| 3,794,943 A | * | 2/1974 | Palmer et al. ................ | 335/69 |
| 5,070,252 A | * | 12/1991 | Castenschiold et al. ....... | 307/64 |
| 5,296,786 A | | 3/1994 | Habisohn et al. | |

FOREIGN PATENT DOCUMENTS

| | | |
|---|---|---|
| DE | 38 23 574 | 11/1989 |
| DE | 44 47 391 | 6/1996 |

* cited by examiner

*Primary Examiner*—Lincoln Donovan
(74) *Attorney, Agent, or Firm*—Kenyon & Kenyon

(57) ABSTRACT

A drive unit is described for switching circuit breakers on and off, in particular disconnecting switches and/or grounding switches of medium-voltage switchgear. The drive unit includes a reversible d.c. motor and a switching device containing two separately drivable and interlocked reversing switches, one assigned to each direction of rotation of the d.c. motor, their contacts performing the current reversal on the windings of the d.c. motor as required to reverse the direction of rotation. The drive unit further includes power contactors whose contacts have the required switching capacity for load switching. The all-or-nothing relays and safety switches are implemented by uniform low-power relays representing the direction of rotation, each having at least two electrically isolated relay contacts connected in parallel and also having an equalizing capacitor connected in parallel to each. Such drive units are used in connection with switchgear for power transmission and distribution.

6 Claims, 2 Drawing Sheets

DRIVE UNIT FOR SWITCHING CIRCUIT BREAKERS ON AND OFF

FIELD OF THE INVENTION

The present invention relates to a drive unit for switching circuit breakers on and off, in particular disconnecting switches and/or grounding switches of medium-voltage switchgear, The drive unit includes a reversible d.c. motor and a switching device containing two separately drivable and interlocked reversing switches, one assigned to each direction of rotation of the d.c. motor, their contacts performing the current reversal on the windings of the d.c. motor as is necessary to reverse the direction of rotation, The drive unit further includes power contactors whose contacts have the required switching capacity for load switching.

BACKGROUND INFORMATION

German Patent No. 38 23 574 describes a drive unit of the type identified above. Within this drive unit, a power contactor is connected upstream from each of two reversing switches which switch without current and the contacts of the power contactor control the switching operations that are subject to load currents. The reversing switches which are not current carrying are provided here as circuit board components, whereas the power contactors with the contacts are not mounted on circuit boards because of their compactness but instead are mounted in a separate space, e.g., in centrally arranged switch boxes. The necessary electric connections between the current-carrying contacts of the power contactor and the non-current-carrying contacts of the reversing switches are created in a conventional way within the switchgear through appropriate cable harnesses for the individual installation.

Depending on the type and extent of the switchgear having a plurality of disconnecting switches and grounding switches which are also equipped with a plurality of motor drives accordingly, there is a variety of different types of cable installations which must also be brought to the various wiring levels through multiple changes because of the differences in current-carrying capacity of the respective power contactors and reversing switches.

SUMMARY

An object of the present invention is to greatly simplify the drive units of circuit breakers with respect to the electric connections of their functional components to one another and in particular to significantly restrict the various types of cable installations of the switchgear because of differences in current-carrying capacity of their different individual components, but without lowering the usual safety standard in this technology. This is achieved according to the present invention providing following:

1.1. reversing switches and power contactors are each formed by a uniform low-power relay representing the direction of rotation,
1.2. the low-power relays each have at least two electrically isolated relay contacts that can be connected in parallel,
1.3. an equalizing capacitor is connected in parallel with each of the relay contacts of the low-power relays.

Equalizing capacitors, which are used in vacuum switches in parallel to their breaker gaps to increase the d.c. currents to be switched, are used for contact elements in a gaseous atmosphere and also for air-insulated relay contacts. Despite the known different properties of these insulation media, it has surprisingly been found that even in the case of contact elements arranged in gas-insulated media, reliable extinction; of the arc can be achieved in a short time when the contacts are opened due to the use of the equalizing capacitors. This permits the possibility of providing the reversing switches and the power contactors in the form of a uniform low-power relay which can be driven as a function of the direction of rotation in a conventional manner. The low-power relays can thus also be used for safe switching of current-carrying circuits. This eliminates all additional measures with regard to cable installations within switchgear as required previously because of differences in the permissible current-carrying capacity. The conventional circuits can be produced with uniform low-power relays.

According to an advantageous embodiment of the present invention:

the relay contacts are implemented by switch contacts that can be blown out magnetically.

Prompt extinction of the arc on opening the relay contacts is also promoted with this essentially known effect.

According to another advantageous embodiment of the present invention, the equalizing capacitors are each designed for a capacitance range corresponding to $10^2$ to $10^5$ times the value of the capacitance of the opened relay contacts.

This capacitance range represents optimum efficiency of the equalizing capacitors with respect to prompt extinction of the arc.

According to another advantageous embodiment of the present invention,:

the low-power relays are arranged with the equalizing capacitors on a common circuit board, the moving parts of the respective relay contacts are connected to a voltage terminal of the respective circuit board, and the fixed parts of the respective relay contacts are connected to a motor terminal of the respective circuit board in each case as a function of the direction of rotation.

By jointly accommodating a plurality of low-power relays on a single circuit board, the conventional switching measures for controlling the drive units for a wide variety of switchgear can be implemented in a small amount of space and with the various types of cable harness greatly reduced.

DETAILED DESCRIPTION

Figure 1:
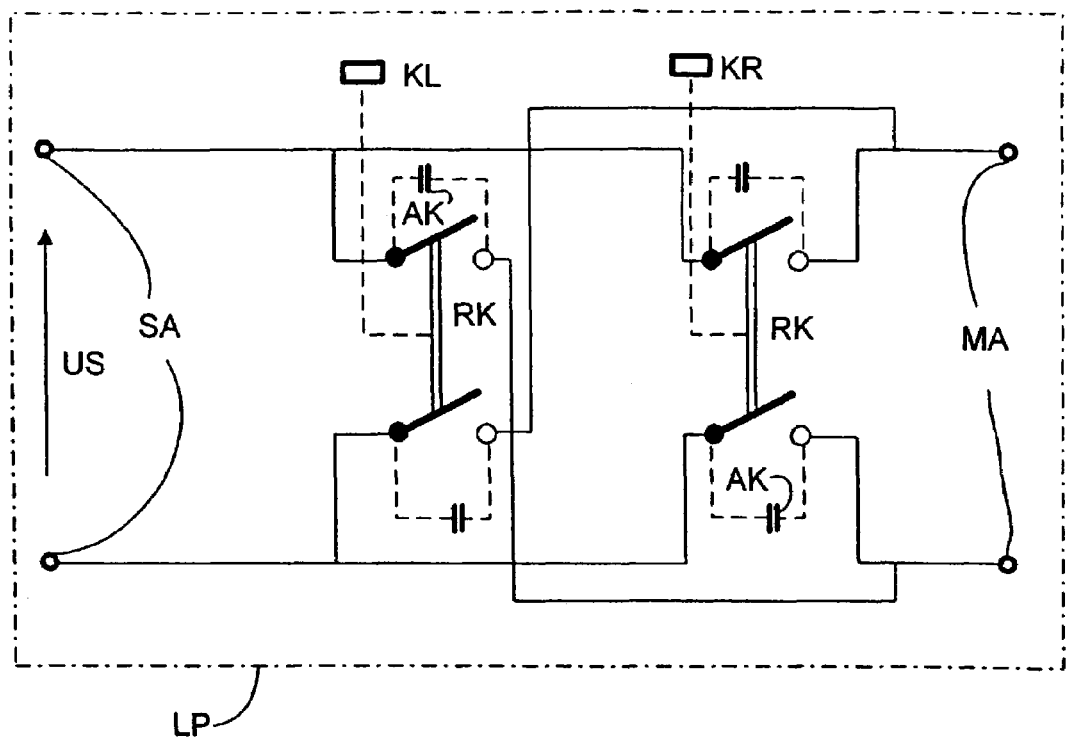
FIG. 1 shows a basic design for controlling a drive unit for a circuit breaker as a function of the direction of rotation, in accordance with the present invention.

FIG. 1 shows low-power relay KL for counterclockwise rotation and low-power relay KR for clockwise rotation, establishing the required circuits between voltage terminal SA of total current US and motor terminal MA with their respective relay contacts RK through current paths on common circuit board LP. It can also be seen that two relay contacts RK of the low-power relay KL for counterclock wise rotation, which are operated in parallel, and two relay contacts RK of the low-power relay KR for clockwise rotation, which are also operated in parallel and are designated in the same way, are each connected in parallel through an equalizing capacitor AK. The non-moving parts of the relay contacts RK of the low-power relay KL for counterclockwise rotation are switched so that total directional voltage US at voltage terminal SA is reversed at motor terminal MA, in contrast with the corresponding non-moving parts of relay contacts RK of low-power relay KR for clockwise rotation. Due to the reversal of total voltage US at motor terminal MA, the direction of rotation of the d.c. motor (not shown) is reversed from clockwise rotation to counterclockwise rotation. Low-power relays KL, KR which can be driven separately are interlocked, i.e., the other low-power relay KL or KR can be driven only when the previously driven low-power relay KR or KL is in a defined starting position.

Figure 2:
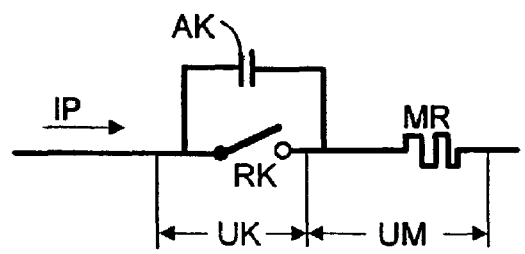
FIG. 2 shows basic wiring of a relay contact having an equalizing capacitor, according to the present invention.

FIG. 2 illustrates the basic wiring of relay contact RK with equalizing capacitor AK connected in parallel with it. As soon as relay contact RK is effectively closed, phase current IP flows through motor resistor MR, in which case the direction of the effective phase current determines the direction of rotation of the d.c. motor at the same time. It is indicated here that contact voltage UK is established at relay contact RK and motor voltage UM is established at motor resistor MR, the value corresponding to total voltage US at voltage terminal SA.

Figure 3:
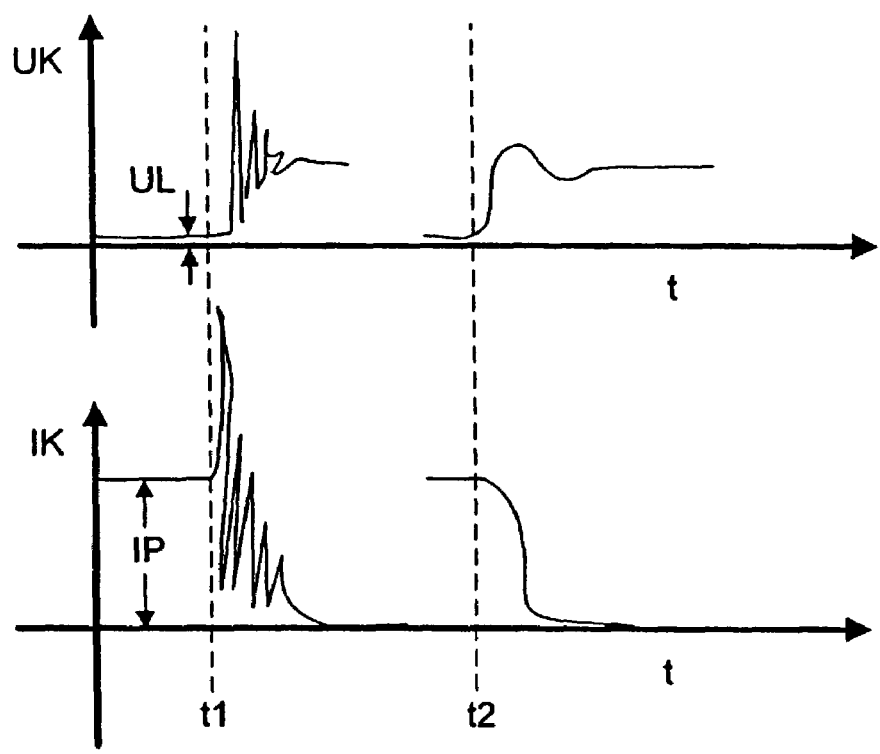
FIG. 3 shows the effect of the equalizing capacitors on the curve of the contact currents and contact voltages on opening the relay contact.

FIG. 3 shows the curve of contact voltage UK and the curve of contact current IK as a function of time t, with the first time t1 indicating the contact voltage curve which was previously customary after reaching arc voltage UL, and phase current IP after opening relay contact RK, while the second time t2 shows in a simplified representation the curves of the same parameters with equalizing capacitor AK connected in parallel to relay contact RK. These altered curves show that both overswing of contact voltage UK and an increase as well as additional loading overswing processes in the case of contact current IK are largely prevented with the equalizing capacitors connected in parallel even in gaseous media.

What is claimed is:

1. A drive unit for switching a circuit breaker on and off, comprising:
   a reversible d.c. motor;
   a switching device including two separately drivable and interlocked reversing switches, each of the reversing switches being assigned to a respective direction of rotation of the d.c. motor, contacts of the reversing switches performing a current reversal on windings of the d.c. motor as is necessary to reverse the direction of rotation of the d.c. motor;
   power contactors, contacts of the power contactors having a switching capacity for load switching, the reversing switches and the power contacts assigned to each direction of rotation being formed by a respective low-power relay, each low-power relay including at least two electrically isolated relay contacts connectable in parallel; and
   an equalizing capacitor connected in parallel to each of the relay contacts of each low-power relay.

2. The drive unit according to claim 1, wherein the circuit breaker includes at least one of a disconnecting switch and a grounding switch of a medium-voltage switchgear.

3. The drive unit according to claim 1, wherein the relay contacts are implemented by switch contacts that can be blown-out magnetically.

4. The drive unit according to claim 1, wherein each equalizing capacitor is designed for a capacitance range corresponding to $10^2$ to $10^5$ times a value of a capacitance of the relay contacts in an open position.

5. The drive unit according to claim 1, wherein the low-power relays are arranged with the equalizing capacitors on a common circuit board, moving parts of the relay contacts are connected to a voltage terminal of the circuit broad, and fixed parts of the relay contacts are connected to a motor terminal of the circuit board as a function of direction of rotation.

6. The drive unit according to claim 1, wherein the d.c. motor is configured to rotate in a clockwise direction and a counter-clockwise direction.

* * * * *